US008821086B2

(12) United States Patent
Tingley, III et al.

(10) Patent No.: US 8,821,086 B2
(45) Date of Patent: Sep. 2, 2014

(54) METHOD AND APPARATUS FOR CONTROLLED-FRACTURE MACHINING

(71) Applicant: Tennine Corporation, Grand Rapids, MI (US)

(72) Inventors: William Q. Tingley, III, Grand Rapids, MI (US); William Q. Tingley, Grand Rapids, MI (US); Daniel R. Bradley, Grand Rapids, MI (US)

(73) Assignee: Tennine Corporation, Grand Rapids, MI (US)

( * ) Notice: Subject to any disclaimer, the term of this patent is extended or adjusted under 35 U.S.C. 154(b) by 0 days.

(21) Appl. No.: 14/081,758

(22) Filed: Nov. 15, 2013

(65) Prior Publication Data

US 2014/0079502 A1 Mar. 20, 2014

Related U.S. Application Data

(63) Continuation-in-part of application No. 12/618,047, filed on Nov. 13, 2009, now abandoned, and a continuation-in-part of application No. 12/520,785, filed as application No. PCT/US2006/062572 on Dec. 22, 2006, now abandoned.

(51) Int. Cl.
*B23D 5/00* (2006.01)

(52) U.S. Cl.
CPC ........................................ *B23D 5/00* (2013.01)
USPC ................ 409/340; 409/289; 409/313; 29/39

(58) Field of Classification Search
CPC ..................................... B23D 5/00; B23D 5/02
USPC ......... 409/289, 305, 304, 313, 315–316, 318, 409/325, 348, 340; 82/120, 121, 122, 159; 83/552, 592; 29/39, 41
See application file for complete search history.

(56) References Cited

U.S. PATENT DOCUMENTS

| 1,084,544 A | 1/1914 | Hanson et al. |
| 1,327,881 A | 1/1920 | Roth |
| 1,912,666 A | 6/1933 | Swanson |

(Continued)

FOREIGN PATENT DOCUMENTS

| EP | 1162018 A1 | 12/2001 |
| EP | 1721701 A1 * | 11/2006 |

(Continued)

OTHER PUBLICATIONS

Machinery's Handbook, 25th Ed., by Oberg et al., 1996, pp. 924-927.*

(Continued)

*Primary Examiner* — Erica E Cadugan
(74) *Attorney, Agent, or Firm* — Barnes & Thornburg LLP

(57) ABSTRACT

An apparatus (100) and method (200) of contact machining having applications in profiling operations utilizes at least one static cutting tool (101) and turret (102) driven by rotary motion (103) about a support mechanism (109) for providing sufficient force to achieve deformation by controlled fracturing (523). This allows the separation of material from a workpiece (105) without imposing axial symmetry upon either the cutting tool (101) or the workpiece (105). The apparatus and method mitigates and/or eliminates the adverse effects of plastic deformation (504) while machining a wider range of shapes and materials with greater productivity and precision than existing methods of machining.

13 Claims, 7 Drawing Sheets

(56) References Cited

U.S. PATENT DOCUMENTS

| | | |
|---|---|---|
| 2,352,132 A | 6/1944 | Southwell |
| 2,474,877 A | 7/1949 | Wilson |
| 2,508,390 A | 5/1950 | Hungerford |
| 2,532,591 A | 12/1950 | Armitage et al. |
| 2,750,852 A | 6/1956 | Selvaggio et al. |
| 2,936,679 A | 5/1960 | Thuerwachter |
| 3,460,435 A | 8/1969 | Hucks et al. |
| 4,101,405 A | 7/1978 | Inoue |
| 4,404,882 A | 9/1983 | Mock |
| 5,662,566 A | 9/1997 | Marxrieser et al. |
| 5,765,976 A | 6/1998 | Ozaki et al. |
| 5,842,819 A | 12/1998 | Meiler et al. |
| 5,875,696 A | 3/1999 | Grossmann |
| 5,901,628 A | 5/1999 | Sakamoto et al. |
| 6,585,463 B1 | 7/2003 | Kaba |
| 6,648,564 B2 | 11/2003 | Yamashita et al. |
| 6,651,535 B2 | 11/2003 | Hafla et al. |
| 6,742,970 B2 | 6/2004 | Oles et al. |
| 6,942,438 B1 | 9/2005 | Deguise |
| 7,017,246 B2 | 3/2006 | Suzuki |
| 2003/0103829 A1 | 6/2003 | Suzuki et al. |

FOREIGN PATENT DOCUMENTS

| | | | |
|---|---|---|---|
| FR | 2222163 A1 | * | 10/1974 |
| JP | 63123603 A | | 5/1988 |
| JP | 01115501 | | 5/1989 |
| WO | 0048786 A1 | | 2/2000 |
| WO | 2008079151 A1 | | 7/2008 |

OTHER PUBLICATIONS

Machine Translation of EP 1721701, which EP '701 was published Nov. 2006.*

Machine Translation of FR 2222163, which FR '163 was published Oct. 1974.*

* cited by examiner

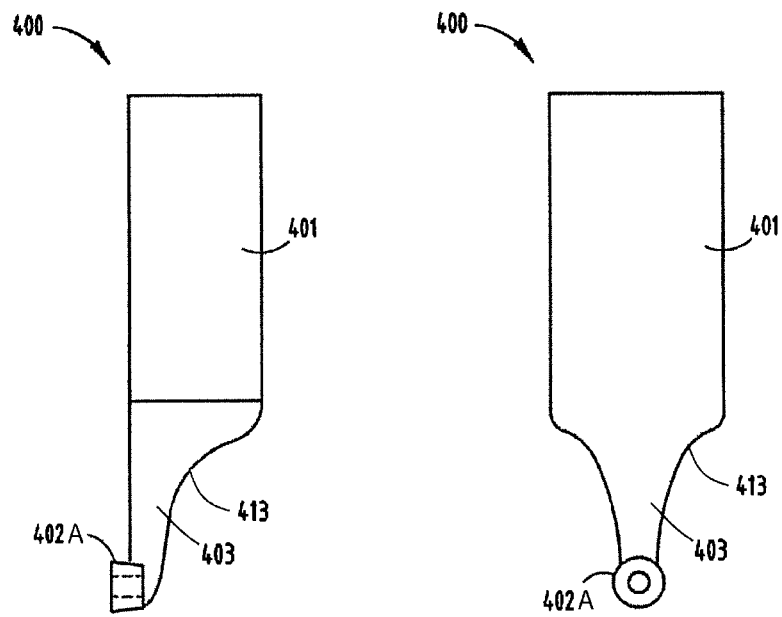
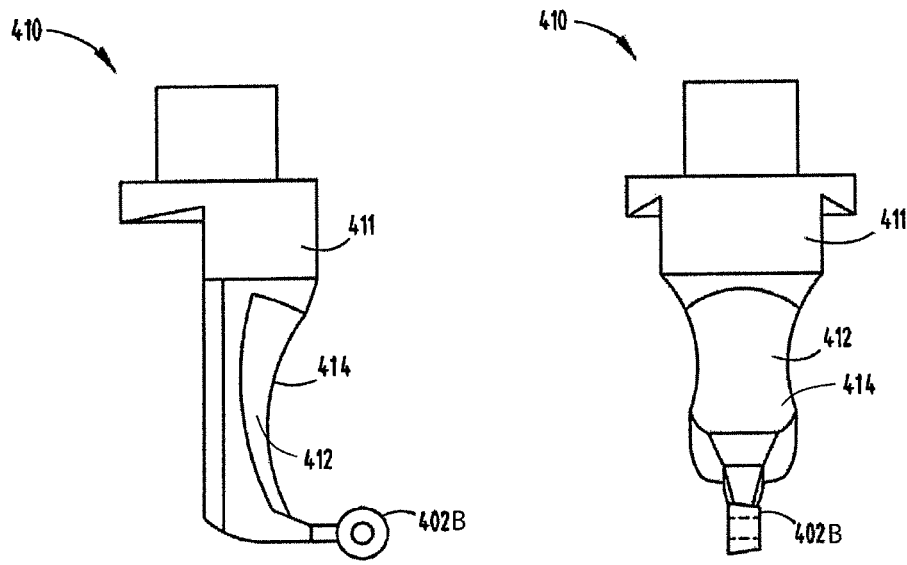

METHOD AND APPARATUS FOR CONTROLLED-FRACTURE MACHINING

CROSS REFERENCE TO RELATED APPLICATIONS

This application claims priority under 35 U.S.C. §120 and is a continuation-in-part of U.S. Application Ser. No. 12/618, 047 filed Nov. 13, 2009, now abandoned, which is a continuation-in-part of U.S. application Ser. No. 12/520,785, filed Jun. 22, 2009, entitled "METHOD AND APPARATUS FOR NON-ROTARY MACHINING," now abandoned, which claims priority to is the national stage of PCT Application Serial No. PCT/US2006/0602572, filed Dec. 22, 2006, now WIPO Publication No. WO2008/079151A1, all commonly assigned to Tennine Corporation and which are herein incorporated by reference in their entirety.

FIELD OF THE INVENTION

This invention relates generally to methods, machines, and tools for machining parts and, more particularly, to those performing profiling operations.

BACKGROUND

There are two basic machining operations that are well known in the art. These might be broadly categorized as "profiling" where material is removed from a workpiece to produce a specified shape and surface finish and "holemaking" where material is removed from a workpiece to produce a drilled, tapped, or counterbored hole. With regard to profiling, in order to profile a workpiece, there are three basic processes for removing material from a workpiece viz. deformation, electrolysis and ablation. Deformation is a process where a cutting tool removes material from a workpiece by direct contact. This process is the least restricted in the shapes and materials that can be cut by the cutting tool. The "turning" and "milling" processes are the most common examples of deformation. Electrolysis is a process where a cathode electrochemically dissolves material from an anodized workpiece. This process is restricted to electrically conductive materials. Electrochemical and electrical discharge machining are examples of electrolysis. Finally, ablation is a process where a beam of energy vaporizes or erodes material from a workpiece. The ablation process is limited to flat work that lacks the requirement for three-dimensional features. Laser and water-jet cutting are examples of the ablation process.

In order to remove material by deformation, or sometimes called "contact machining", there are two basic mechanisms. The first is rotary motion in which either the cutting tool or the workpiece is fixtured to a spindle and rotated to provide sufficient force to remove material. In turning, the workpiece rotates as the cutting tool moves through it. Similarly in a milling process, the cutting tool rotates as it moves through the workpiece. The second is non-rotary motion in which neither the cutting tool nor the workpiece rotates and the force of the linear motion of the tool relative to the workpiece is sufficient to remove material. Shaping, planing, and broaching are examples of non-rotary machining techniques using deformation.

A problem associated with these types of prior art processes is that they do not include techniques for precisely and rapidly machining complex and/or extreme shapes out of ductile and brittle materials in mass production, mass customization, and make-to-order manufacturing environments.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

FIGS. 4A, 4B, 4C and 4D are illustrations showing side and front views of axially asymmetrical cutting tools used according to an embodiment of the invention.

DETAILED DESCRIPTION OF THE INVENTION

Figure 1:
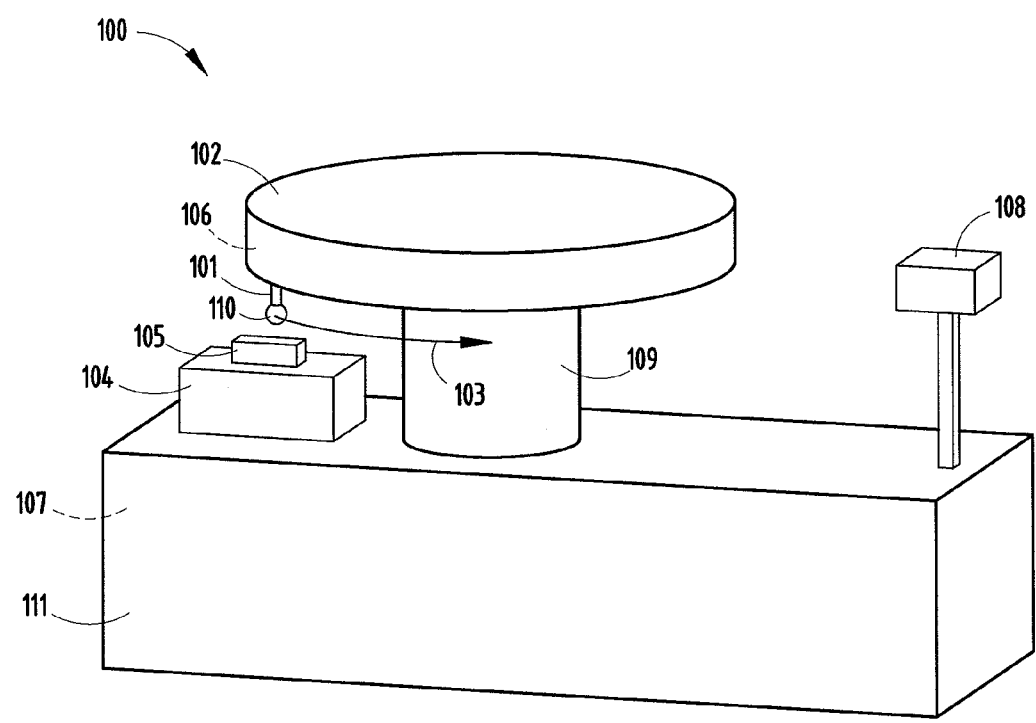
FIG. 1 is a block diagram illustrating a basic apparatus as used in an embodiment of the present invention.

Before describing in detail embodiments that are in accordance with the present invention, it should be observed that the embodiments reside primarily in combinations of method steps and apparatus components related to controlled-fracture machining. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The present invention defines a unique combination of rotary and non-rotary machining apparatus and processes. The effect of a combination of rotary and non-rotary mechanisms enables the present invention to remove material by controlled fracturing, which is the ideal for use in profiling techniques. The process and apparatus as defined herein are not achieved by any other method of machining known in the prior art.

The invention, as defined herein, is unrelated to a process sometimes called "controlled fracturing", in which a flat piece of material is scored by a laser to facilitate its later breakage into uniform pieces. The controlled fracturing process of the invention occurs when a material's yield strength and breaking strength are exceeded simultaneously. In other words, strain is instantaneous so there is no plastic deformation of the material being machined. Additionally, this also avoids attendant phenomena, like expansive heating and strain-hardening, which can chaotically complicate the machining process. Because prior art methods of contact machining are restricted to plastic deformation for removing material from a workpiece, complications are inherent in their operation and work to severely restrict performance in terms of productivity, precision, and applicability.

In order to avoid these shortcomings, the present invention's removal of material by controlled fracturing is useful for a number of reasons: 1) the present invention can remove material from a workpiece at a much higher rate by at least one or two orders of magnitude than prior art machining techniques; 2) the present invention mitigates and sometimes eliminates the chaotic effects of expansive heating and strain-hardening inherent in current methods of contact machining and so is more precise in the fit and finish it imparts to a part; 3) for the same reason, the invention can also produce shapes that are complex (e.g., highly curved airfoiling) and extreme (e.g., very thin cross-sections) that cannot be done using prior art machining methods; and 4) the invention is usable with materials, such as carbon fiber composites, which are typically too brittle for plastic deformation, i.e. their yield strength is identical to their breaking strength and so are difficult or impractical to machine by other prior art methods. Thus, a purpose of the present invention is to profile parts by means of contact machining more rapidly and precisely than existing art, including parts of shapes and materials that are impractical or impossible to profile with using machining techniques presently available in the art.

FIG. 1 is an illustration of a controlled fracturing apparatus incorporating elements of the present invention. The controlled fracture machining apparatus 100, as seen in FIG. 1, works to profile parts by means of contact machining. This type of machine has greater precision and operates more rapidly to machine products having shapes and using materials that are impractical or impossible to profile with machines existing in the prior art.

More specifically, the controlled-fracture machining apparatus 100 includes one or more non-rotating cutting tools 101 fixtured at or near the outer circumference of a turret 102. The tool may be attached to the turret by tool holders used with CNC lathes and the like. The rotation 103 of the turret 102 operates to provide sufficient cutting force to achieve deformation by controlled fracturing as defined herein. In operation, one or more tables 104 are placed on an upper surface of a base 111. Although the table 104 is shown in a substantially rectangular configuration, it will be evident to those skilled in the art that other shapes and sizes of table are also possible. At the top surface of the table 104, a workpiece 105 is fixtured so that when the table 104 moves under the turret 102, the circumferential movement of the cutting tool(s) 101 can engage the workpiece(s) 105 to remove material. As will be evident to those skilled in the art, each cutting tool 101 and each table 104 can move independently along separate sets of linear and/or rotary axes 106,107 within a three-dimensional work envelope. Those skilled in the art will further recognize that mechanical mechanisms are embedded in the turret 102 for allowing the base for moving the turret and table along the axes shown in FIGS. 3A and 3B and as substantially described herein. Thus, both the turret and table move in a three-dimensional workspace for profiling the workpiece into a predetermined shape. This has an advantage of allowing the cutting tool 101 and workpiece 105 to be offset from the arc of the turret's rotation 103. The cutting tool 101 then works to remove material by cutting the workpiece 105 into any desired shape.

Additionally, a programmable controller 108 is used to produce the tool paths required for specific movements while a support mechanism 109 operates to synchronize the rotation 103 of the turret 102 with the movements along the rotary axis 106,107 of each cutting tool 101 and each table 104. Although motors for the turret that provide driving motion as well as servos or linear drives used to provide positioning motions of the tool and the table are not shown, these devices are controlled by the programmable controller 108 and will be evident to those skilled in the art. Moreover, one or more microprocessors are used in combination with the programmable controller 108 along with software and other computer readable code to control tool path movement. The microprocessor is used for executing a series of steps as provided herein namely independently moving the at least one cutting tool and the at least one table in a three-dimensional workspace for cutting the workpiece into a predetermined shape using controlled fracturing, such that there is instantaneous strain of material with no plastic deformation. The processor for the controlled fracturing apparatus uses a sequence of steps as described with regarding to FIG. 2. The loading 202 and unloading 211 of the workpiece on the machine's table can be controlled by the processor or through the use of robotics or other forms of automation.

The apparatus 100 is advantageous in that it uses no rotary motion that would impose axial symmetry upon the contour of either the cutting tool 101 or the workpiece 105. Finally, these elements are configured so that the present invention is superior to all other methods and apparatuses of contact machining in productivity, precision, and applicability. Those skilled in the art will recognize that the positioning motion to achieve controlled fracturing involves rotating the cutting tool 101 and/or the table 104 in both x and y axis so that the desired material is removed from the workpiece 105. The positioning motion will depend on many factors including but not limited to the type of cutting tool, workpiece shape and type material to be removed from the workpiece.

Thus, controlled-fracturing is induced in the workpiece using steps of applying an abrupt, localized, and substantially extreme force of a cutting tool against the workpiece. This force must be sufficient to exceed the ultimate shear strength of the material of the workpiece. When the force is applied, shear bands form in the workpiece as a microstructure of cracks emanating in the direction of the cutting tool within the outside contour of the cutting tool as projected into the workpiece. Under the continued force of the cutting tool moving through the workpiece, this microstructure softens relative to the uncut material surrounding it, because the cracked material becomes highly fractured, even to the point of recrystallizing. Once softened the cutting tool shears this material from the workpiece as waste retaining almost all of the heat generated by the process, because its microstructure of cracks retards the transfer of heat to material outside of the microstructure. The end result of this controlled-fracturing process results in a shape cut into the workpiece with the same contour as the cutting tool.

The force sufficient to propagate the shear bands for controlled-fracturing varies with the material of the workpiece. The cutting tool must apply at least 60,000 pounds of force per square inch of areal contact with the workpiece if it is cold-rolled mild steel; 80,000 pounds for alloy steel; 150,000 pounds for stainless steel; 50,000 pounds for titanium; 20,000 pounds for aluminum; and 50,000 pounds for aluminum-bronze. These forces can be applied as required to achieve the necessary surface footage for material removal. Consequently the only restriction upon the volumetric rate of material removal are the surface footage, depth of cut, and width of cut limitations of the cutting tool. This distinguishes the invention from machining processes in prior art, in which the volumetric rate of material removal is restricted by the limitations of both the workpiece and the cutting tool. The end result is the optimization of the cutting tool's performance to its ideal.

Therefore in summary, an embodiment of the invention is a machining apparatus for use in controlled fracturing of materials exhibiting both ductile and brittle properties that includes a support mechanism extending from a base section. A turret is connected to the support mechanism for providing substantially a rotational movement of the turret about the support mechanism where a cutting tool fixedly attached below the turret. At least one table is attached to the base section for holding a respective workpiece in a fixed position in relation to the table. A controller uses a microprocessor for controlling movement of the cutting tool and its angle relative to the workpiece surface and the position of the at least one table used for holding the workpiece and for applying a predetermined force to the workpiece material. The cutting tool and the table are moved independently in a three-dimensional workspace for cutting the workpiece into a predetermined shape using controlled fracturing such that the yield strength and the breaking strength of material in the workpiece are exceeded simultaneously such that there is instantaneous strain with no plastic deformation.

Figure 2:
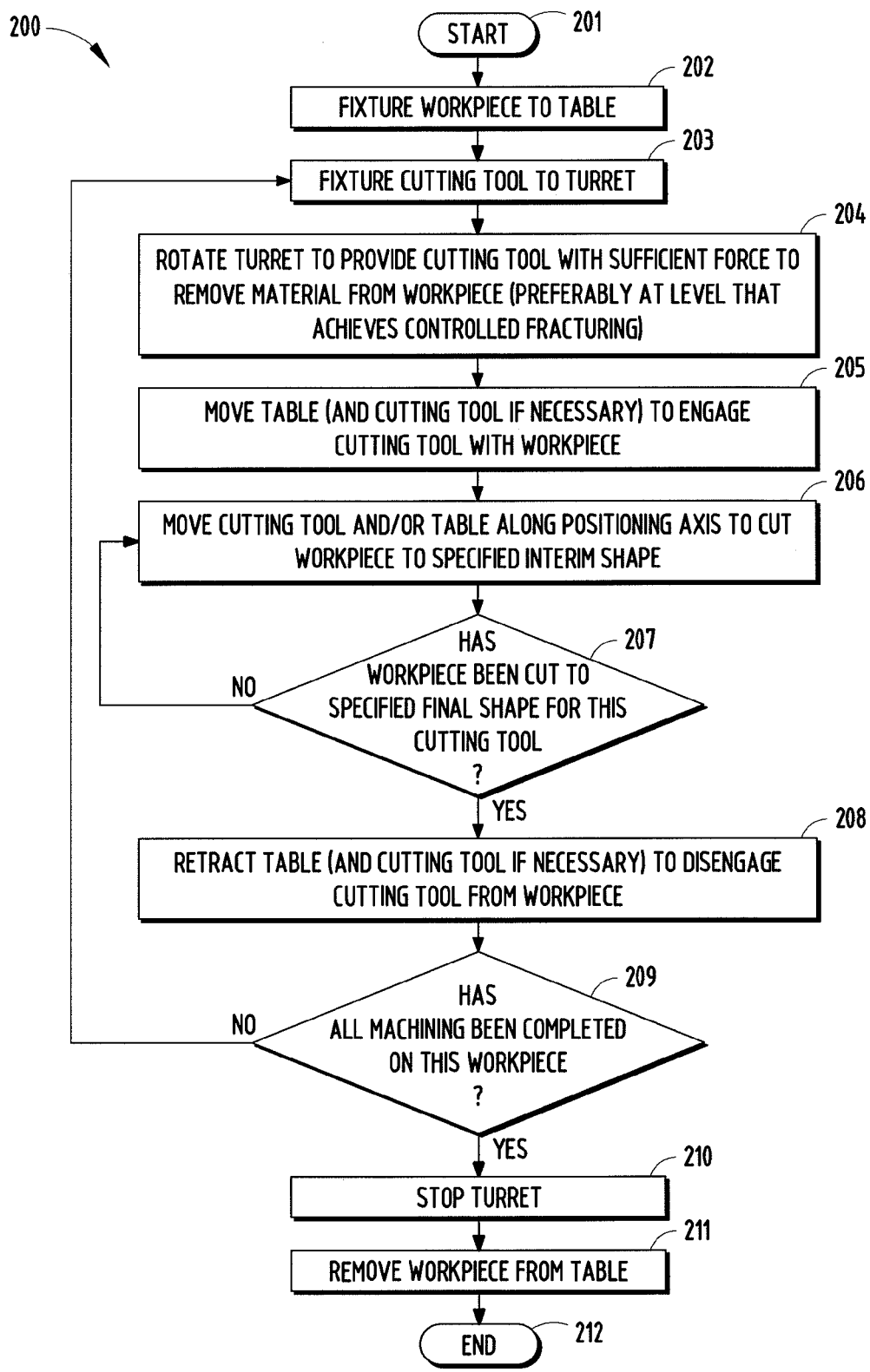
FIG. 2 is a flowchart diagram illustrating the basic method of the present invention's operation.

FIG. 2 is a flowchart diagram illustrating the basic method of the present invention's operation. The method of operation 200 of the invention includes the steps where the process begins with the apparatus at rest 201. The workpiece is fixtured to the table 202 while the cutting tool is fixtured to a turret 203. The turret rotates to provide the cutting tool with sufficient force to remove material from the workpiece, preferably at a magnitude that achieves controlled fracturing 204. The table and the cutting tool both can move to a position for engagement of the cutting edge 110 of cutting tool with the workpiece 205. The cutting tool and the table move simultaneously and continuously along their own sets of linear and/or rotary axes as needed to offset the cutting edge of the tool from the arc of the turret's rotation to machine the workpiece to the specified interim shape 206. The linear and/or rotary axes can be continually moved so that the correct position and surface of the cutting tool is in contact with the workpiece to remove a desired amount of material. This is repeated as needed until the specified final shape to be produced by the cutting tool is achieved 207. The table and the cutting tool (if necessary) retract to disengage the cutting tool from the workpiece 208. If further machining is required, steps 203 through 208 are repeated with different cutting tools until machining is completed 209. The turret stops 210 and the workpiece is removed from the table 211. The process ends with the apparatus at rest 212.

In that the turret 202 can act as a fixture for multiple cutting tools 203 and multiple workpieces can be placed on tables around the turret 202, variations upon the operation 200 of the controlled-fracture machining apparatus are also possible. For example, one variation is using both identical cutting tools and identical workpieces so that each rotation of the turret 202 completes not just one cut on one workpiece but as many cuts on each workpiece as the number of cutting tools fixtured to the turret 202. Therefore, if twelve cutting tools are engaged with twelve workpieces 205, then each rotation of the turret 202 cuts at a rate twelve times faster for each of the twelve workpieces 206. The result is that productivity of each rotation is increased, compared to a single tool cutting a single workpiece, by a multiple of the number of cutting tools times the number of tables. This facilitates mass production of a part.

Another variation is that all of the workpieces are identical, but the cutting tools differ to perform different operations on the workpieces 206. For instance, the turret is fixtured with both tools for roughing and finishing the workpieces 203, so that in the same rotation they are "roughed in" and then finished to the final shape 207. The productivity gain would be similar to that above. As described herein, this type of operation greatly facilitates mass production of a part.

A third variation is that the workpieces differ and are set up on the tables as a family of parts that can be machined with the same set up of cutting tools 203. Because the offsetting movements of each cutting tool and each table are independent of the others, the path of each cutting tool through each workpiece 206 can be altered as needed to produce a finished shape 207 unique to that part. This facilitates mass customization and make-to-order production of parts with the productivity of mass production.

Thus, the present invention employs two types of motion. The first is motion to drive the cutting tool through the workpiece with sufficient force to cause material deformation. This is a circumferential driving motion 103 and described with regard to FIG. 2. The second is motion to position the cutting tool and the workpiece relative to each other and to the path of the driving motion. This directs the deformation of the workpiece into the shape and finish specified for the completed part. This is the positioning motion as described with regard to FIG. 2.

The driving motion is produced by the rotation of the turret to which the cutting tool is attached. The cutting tool is static relative to the driving motion—i.e., its cutting edge does not rotate about an axis as does a milling tool. Therefore, the cutting tool removes material from the workpiece at step 206 in a manner superior to that of a milling tool in terms of productivity, precision, and applicability as disclosed in Applicant's non-rotary machining methods. The present invention is distinguished from the non-rotary machining techniques in that it embodies a rotary driving motion to deliver sufficient cutting force to a static tool at step 204. By means of this relationship between a rotary driving motion and a static cutting tool, axial symmetry is not imposed upon either the cutting tool or the workpiece and so allows for a nearly unrestricted range of shapes and materials to be machined as described in FIG. 2. This relationship for contact machining is unique to the present invention and not known in prior art.

By its nature, a rotary driving motion imposes a circular or arced tool path upon the cutting tool. Without further modification, the cutting tool could only machine into the workpiece a curve of a fixed radius. The positioning motions of the present invention offset the cutting tool and the workpiece from the arc of the driving motion so that any combination of segments and curves in three-dimensional space can be machined into the workpiece Furthermore, these positioning motions also change the orientation of the tool's cutting edge 110 relative to the surface to be cut into the workpiece for optimizing the performance of the cutting tool 101. This optimization is produced when forces are applied in combination with cutting tool's cutting angle and orientation to the workpiece surface. This is differentiated by planing and shearing, as known in the prior art, since forces used in controlled fracture occurs when yield strength and breaking of the material are exceeded simultaneously. These positioning motions are produced, at a minimum, by moving the cutting tool along a set of linear and rotary axes 106, relative to the surface of the workpiece, necessary to achieve controlled fracture. This can be improved, in terms of speed and range of possible tool paths, by also moving the table, to which the workpiece is attached, along its own set of linear and rotary axes 107. By this means a static cutting tool can profile a three-dimensional part as disclosed in the U.S. application Ser. No. 12/520,785, now abandoned, and not otherwise known in prior art. Again, the present invention is distinguished from the prior art in that the present invention embodies a turret utilizing a rotary driving motion 103, from which the cutting tool and workpiece must be offset by the positioning motions via independent sets of axes 106, 107.

Figure 3A:
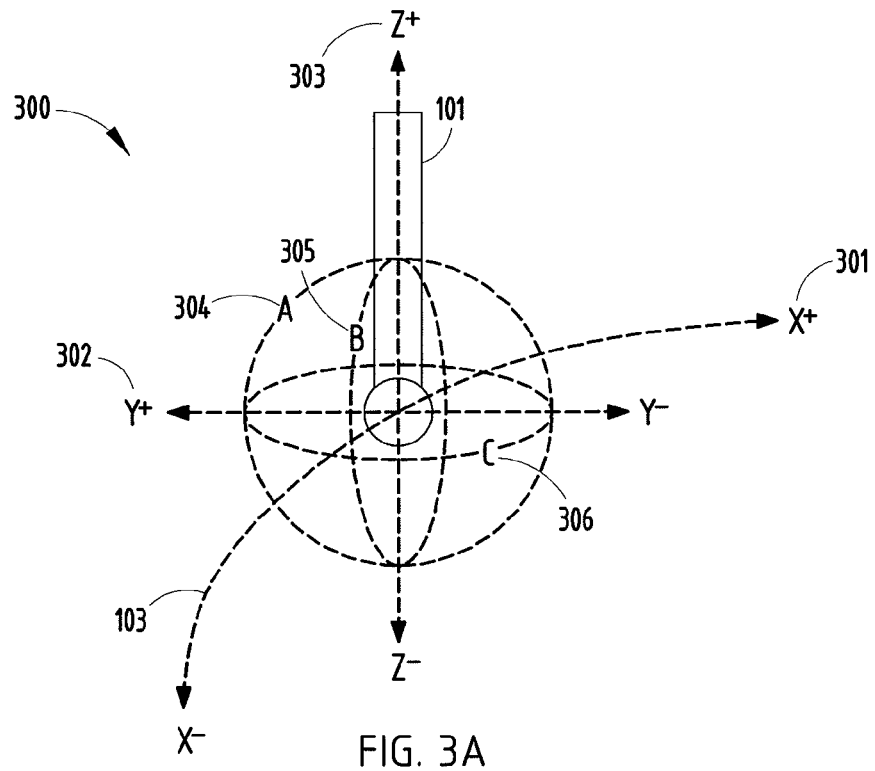
FIGS. 3A and 3B are diagrams of the linear and rotary motions of the cutting tool and table according to an embodiment of the invention.
Figure 3B:
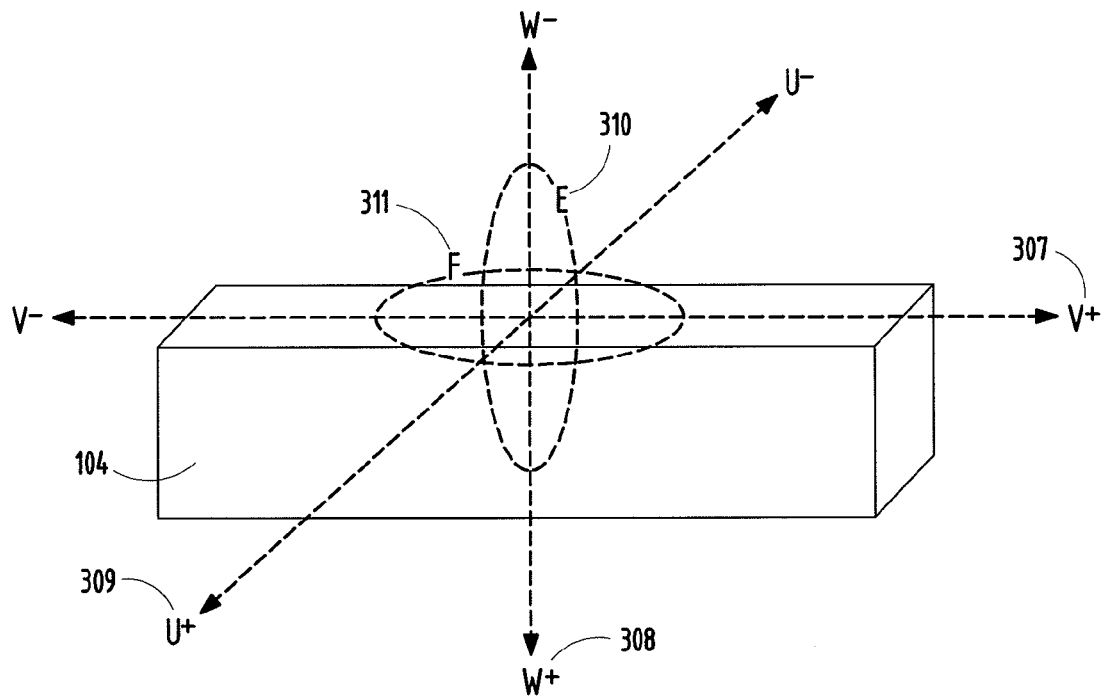

FIGS. 3A and 3B are diagrams illustrating both the linear and rotary motions of the tool and table respectively according to the embodiments of the present invention. As seen in FIG. 3A, the present invention's axes of motion 300 determines the tool path that the cutting tool will take through the workpiece. Accordingly, there are eleven linear axes 301, 302, 303, 307, 308, 309 and rotary axes 304, 305, 306, 310, 311 of motion that are possible for the present invention. The conventions and mechanisms of the linear and rotary axes 106, 107 for positioning the cutting tool as seen in FIG. 3A and the table as seen in FIG. 3B will be evident to those skilled in the art. A primary feature of the invention involves using the rotary driving motion as a linear tool path axis which is neither shown nor suggested in the prior art. Those skilled in the art will recognize that many small linear tools path segments and/or movements can be joined to provide arcuate movement which resulting from rotational movement of the tool. FIG. 3A illustrates the X-axis 301 of the cutting tool while the linear axis radial to the X-axis 301 is the Y-axis 302 of the cutting tool. The turret's rotation 103 provides motion along X-axis 301 while the rotary axis 106 provides motion along Y-axis 302 though rotary axis 306. The linear axis perpendicular to the plane is defined by the X- and Y-axes 301, 302 is the Z-axis 303 of the cutting tool. The rotary sweep of the cutting tool around the X-axis 301 is the A-axis 304. By a similar convention, the sweep around the Y-axis 302 is the B-axis 305, and around the Z-axis 303 is the C-axis 306.

Those skilled in the art will recognize that a control mechanism, located within the turret 102, positions the cutting tool relative to the workpiece by motion along the Y-, Z-, A-, B-, and C-axes to produce the specified shape and finish of a part. The parallel linear axes of the table are illustrated as the U-, V-, and W-axes 307, 308, 309 respectively. Because the A-axis 304 motion of the cutting tool is sufficient for positioning in all cases, the table 104 does not necessarily require a parallel positioning axis. Therefore, the parallel rotary axes of the table 104 are illustrated as the E- and F-axes 310, 311. Further, a control mechanism located inside the base 111, positions the table 104 relative to the cutting tool 101 by motion along the U-, V-, W-, E-, and F-axes to produce the specified shape and finish of a part. The rotary axis 107 provides motion along W-axis 307 though F-axis 311. The "plus" and "minus" directions of all these axes 300 accord to the conventions known to skilled artisans familiar with machining apparatus and processes.

FIGS. 4A, 4B, 4C and 4D are illustrations of the side and front views respectively of axially asymmetrical cutting tools as used with the invention. The present invention's configuration of driving motion and positioning motions as described in step 206 of FIG. 2, avoid the need to rotate either the cutting tool or the workpiece about an axis. This eliminates the imposition of axial symmetry upon either cutting tool or workpiece. The practical effect of this is that the present invention can employ a cutting tool 101, as detailed by the examples in FIGS. 4A, 4B, 4C, and 4D. In these illustrations, tool 400 and tool 410 are cutting tools having a body 401, 411 and an extension 403, 412 that are axially asymmetrical, i.e. they do not have the same shape on opposite sides of the tools. The cutting tools include a cutting edge 402A, 402B, for the purpose of removing material from the workpiece as described with regard to FIG. 2, which may be either integral to the extension 403, 412 or inserted therein. Both tools 400 and 410 include tapered, recessed, or angled reliefs along the body allowing the tool to remain clear of features previously cut into a workpiece while retaining the tool's rigidity. These reliefs 413, 414 allow the tool to create an undercut for three-dimensional or other complex features that are either impractical or impossible in other methods of contact machining.

Figure 5A:
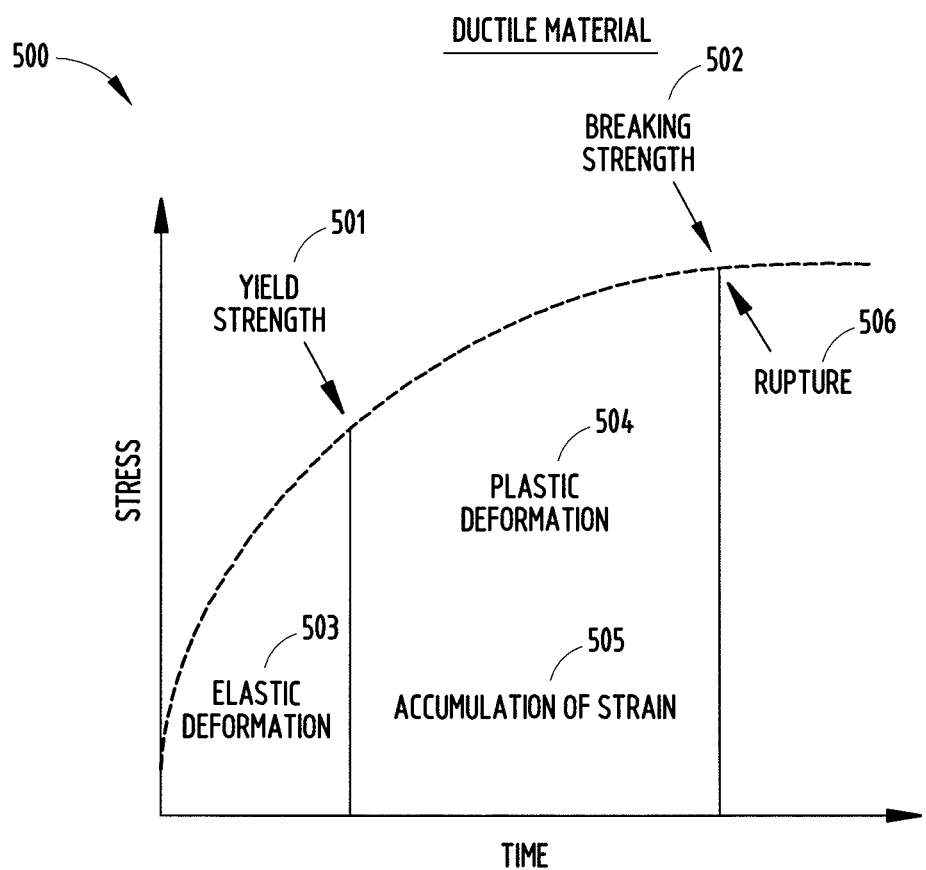
FIGS. 5A, 5B and 5C are chart diagrams illustrating elastic, plastic, and controlled-fracture phases respectively of deformation.
Figure 5B:
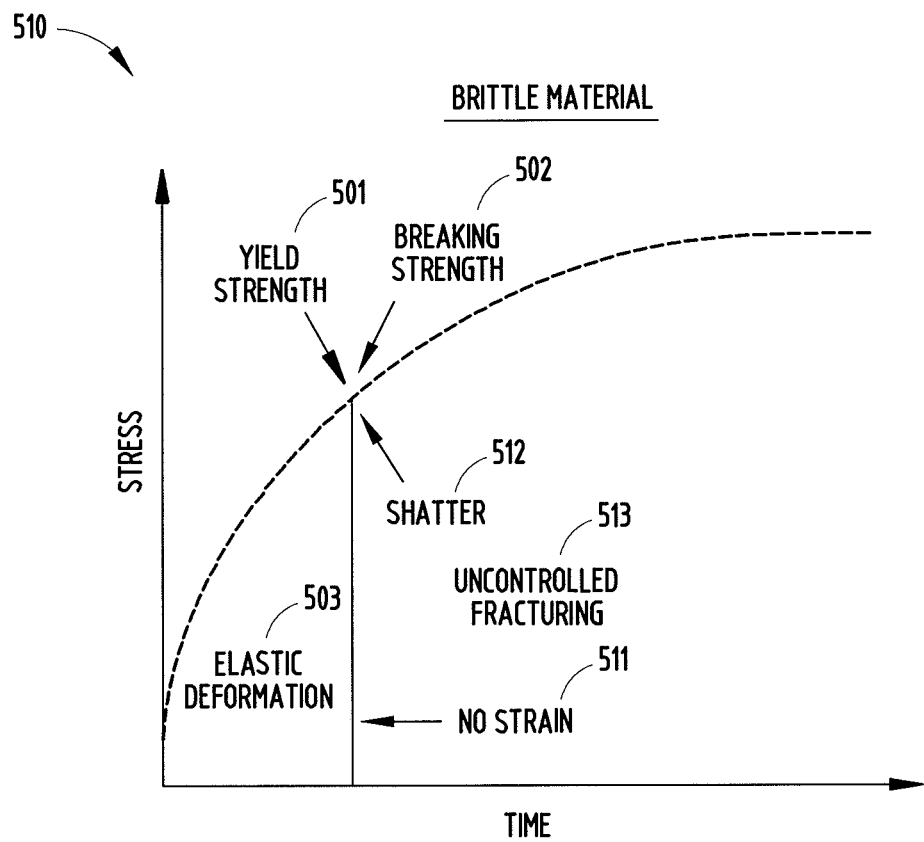
Figure 5C:
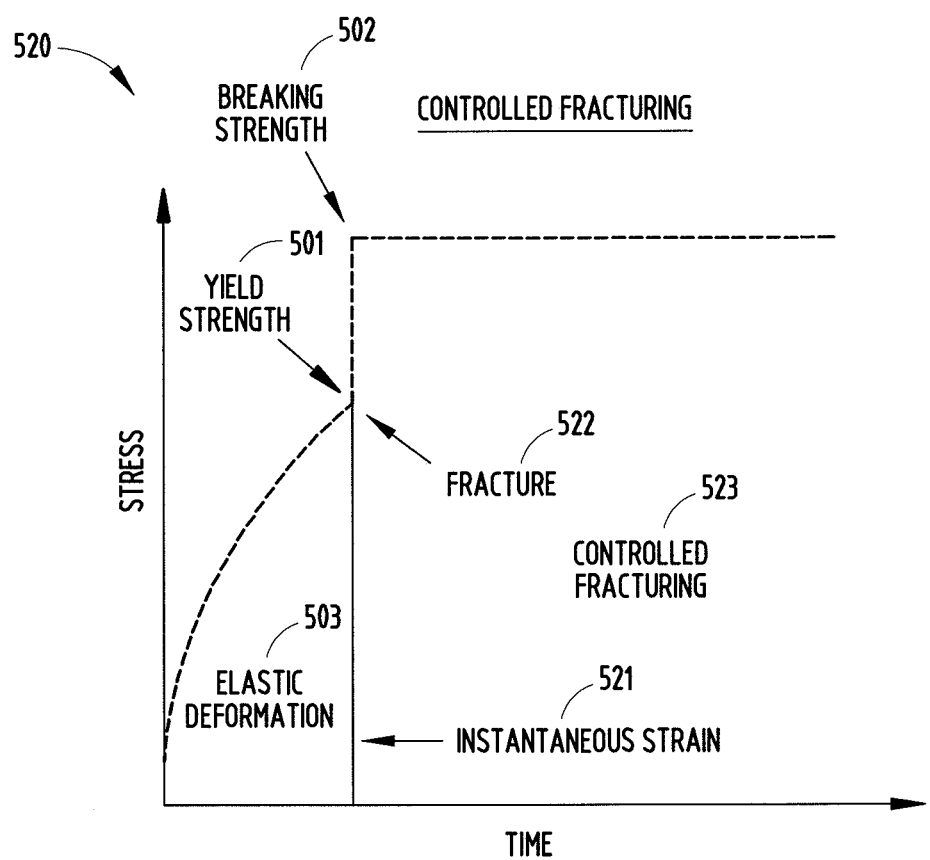

FIGS. 5A, 5B and 5C are charts illustrating the nature of the elastic, plastic, and controlled-fracture phases of deformation. As seen in these charts, depending upon the cutting force of the driving motion 103, the present invention removes material from the workpiece by either plastic deformation 504 or controlled fracturing 523. In both cases, it does so at volumetric rates of material removal one or two orders of magnitude greater than that of existing art. However, controlled fracturing 523 is the superior process, because it mitigates or eliminates the expansive heating and strain-hardening that characterize plastic deformation 504. These effects cause difficulties in the machining process by degrading speed and precision; limiting the range of shapes and materials that can be machined; shortening machine and tool life; and destabilizing production with unpredictable factors. To the extent that the cutting force that the present invention applies to the material of a workpiece approaches instantaneous strain 521, and achieves controlled fracturing 523, the period of plastic deformation 504 is reduced and so are its adverse effects.

As described herein, controlled fracturing 523 offers the ideal level of deformation in a profiling operation, and is the process of contact machining that works to achieve certain predefined goals. As seen in each of FIGS. 5A and 5C, deformation of a ductile material occurs at three levels 503, 504, and 523. The first level is elastic deformation 503, in which the material will return to its original shape once it is relieved of stress. If the stress exceeds the material's yield strength 501, then the second level, plastic deformation 504, is reached and the material is permanently deformed. The continued application of stress to a plastically deformed material will cause strain to accumulate 505 until it exceeds the material's breaking strength 502 allowing it to rupture 506. For the methods of contact machining in existing art, this level of deformation is the best that can be achieved and is observed as the cutting tool operating to separate irregularly chipped material from a workpiece.

Generally, the longer it takes strain to accumulate 505, the greater are the effects of expansive heating and strain-hardening, and the more severe is the resulting chaos in the material removal process. Therefore, reducing or even eliminating the time it takes the accumulation of strain 505 to rupture 506 a material is desirable. Thus, the ideal is instantaneous strain 521, in which a material's yield strength 501 and breaking strength 502 are exceeded at the same time. This, in effect, makes a ductile material 500 behave like one that is brittle 510, in which no plastic deformation 504 occurs as a cutting tool removes material from a workpiece, as seen in FIG. 5B. Instead of pulling a material apart by rupturing it 506, the force of the cutting tool cracks 522 the workpiece along lines of fracture to separate pieces of material, as seen in FIG. 5C. This process is termed "controlled fracturing" 523, which is the third level of deformation. The shape, orientation, and direction of the tool's cutting edge 110 determine how the material will fracture 522 by concentrating the heat generated from the cutting tool's 101 contact with the workpiece into adiabatic bands emanating from the perimeter of the cutting edge in the direction of the cutting tool's motion. The heating within these bands causes micro-cracks to form which then connect under the continued stress of the cutting force and fractures material loose from the workpiece along a line conforming to the perimeter of the cutting edge. The present invention controls these cutting tool factors to produce the desired shape and finish without the adverse effects of plastic deformation 504 that limit the performance of all other methods of contact machining in existing art. Hence, the steps necessary to achieve controlled fracture involve changing, i.e. increasing and/or decreasing, both the forces applied to the workpiece material and cutting tool angle relative to the workpiece surface in a manner to achieve a concentration of heat to provide adiabatic bands emanating from the perimeter of the cutting edge of the cutting tool in the direction of the cutting tool's motion.

In use, there are many possible configurations of the essential elements of the apparatus 100 and the motions 300 it can produce to execute the basic method 200 of the present invention and its variations. These include vertical and horizontal layouts of the turret; axial and radial orientations of the cutting tool and table to the turret; multiple cutting tools and multiple tables; partial to full sets of linear and rotary axes for positioning the cutting tool and the table; a double- or multiple-turret layout moving cutting tools along a belt- or chain-driven rail system that translates the rotary driving motion of the turrets into long linear drives for machining very large workpieces or very large numbers of workpieces; workstations integrated into the apparatus to perform non-profiling operations such as holemaking; incorporation of automation technologies with the apparatus such as probes, tool changers, and pallet systems; among other things. In one embodiment of the invention, the stylized illustration of the apparatus 100 shown in FIG. 1 will include features where 1) the axis of the turret 102 is vertical to the base 111; 2) each cutting tool 101 is fixtured axially to the circumference of the turret 102; 3) the work surface of each table 104 is perpendicular to the axis of the turret 102; 4) twelve cutting tools 101 and twelve tables 104 may be uniformly located around the circumference of the turret 102; 5) each cutting tool 101 has a separate mechanism (not shown) for positioning on the Y-, Z-, A-, B-, and C-axes 302, 303, 304, 305, 306; 6) each table 104 has a separate mechanism for positioning on the U-, V-, W-, E-, and F-axes 307, 308, 309, 310, 311; and 7) probes, a tool changer, and a pallet system, known in prior art, are incorporated into the apparatus 100 to automate production.

Thus, the present invention as described herein employs a rotary driving motion 103, positioning motions via axes 300, and axially asymmetrical tooling 400, 410 used in a manner, not known to prior art. The invention makes possible a controlled fracturing process used on various materials used to profile parts. Consequently, the present invention is superior to the existing art for profiling machining operations in terms of:

1) Volumetric material removal rate: As described in U.S. application Ser. No. 12/520,785, now abandoned, the effective feed rate of the cutting tool through the workpiece is its surface footage for a given material. When restricted to plastic deformation, this can produce a volumetric material removal rate of approximately 40 times greater than milling in a profiling operation. Because the present invention uses a rotary driving motion to achieve controlled fracturing for removing material and so reduces or eliminates expansive heating, strain hardening, and friction, the feed rate of the cutting tool can exceed its generally accepted surface footage. Therefore, the volumetric material removal rate of the present invention in the controlled fracturing mode can be two orders of magnitude greater than milling;

2) Productivity: The present invention significantly increases the rate of production, compared to existing art, commensurate with its increased volumetric material removal rate. This is further enhanced with the preferred embodiment of the invention, which includes multiple cutting tools and multiple tables. As previously stated, these multiple workstations increase productivity by a multiple of the number of cutting tools times the number of tables. For example, with twelve of each, productivity is increased by as much as 144 times over a setup of a single cutting tool and single table. Combined with the present invention high volumetric removal rate of at least forty times greater than milling, such an embodiment of the present invention would have a productivity that is as much as 5,760 times greater than a milling machining center making the same part;

3) Precision: Because the process of material removal for contact machining in the existing art is plastic deformation, the accumulation of strain generates expansive heat and strain-hardening in the cutting tool and the workpiece. This increases the chaotic elements in a profiling operation, which reduces the dimensional precision of the shape being produced. It is the primary cause of process failure, usually by tool breakage. The present invention mitigates these adverse effects by significantly reducing the accumulation of strain, ideally to the point of instantaneous strain to achieve controlled fracturing. Precision is further enhanced because neither the cutting tool nor the workpiece is rotating on axis, as in the case of milling and turning respectively. The absence of this extra motion eliminates the imprecision caused by imperfections in the mechanism and operation of a spindle necessary to provide that rotation;

4) Finish: For the same reasons stated above, the surface finish that the present invention imparts to the part is improved. Furthermore, the present invention uses axially asymmetrical static cutting tools. Because they are axially asymmetrical, such tools can feature cutting edges that match the geometry of the specified shape. Because they are static, they can keep that edge continuously in cut in the workpiece. The result is a far more stable removal of material, compared to the discontinuous chipping of material by the rotating flutes of an end mill. Thus, the present invention produces a smoother and cleaner surface finish on the part;

5) Range of machinable materials: The present invention can machine all materials that the existing art can. Furthermore, it can readily machine materials that are extremely difficult or impossible to machine by the existing art. In one category of such materials are heat-resistant alloys, nickel alloys, and titanium alloys. The heat that current methods of contact machining generate in these materials by plastic deformation becomes uncontrollable and leads to process failure unless the volumetric rate of material removal is kept very low. In another category are brittle materials, such as carbon-fiber composites, which tend to shatter 512 instead of rupture 506 when the cutting force applied by current methods of contact machining exceeds its breaking strength. This leads to uncontrolled fracturing 513 of the material in the form of splitting, cracking, and delamination beyond the area of the cut. The present invention overcomes these limitations in the existing art by achieving controlled fracturing in both categories of materials; and 6) Range of machinable shapes: For the same reasons stated above, the present invention can machine a greater range of shapes than the existing art. The elimination of excessive heating and uncontrolled fracturing makes it possible for the present invention to machine very thin cross-sections and other delicate features. Furthermore, the present invention's use of axially asymmetrical tools within a three-dimensional work envelope allow it to machine undercut features of nearly unrestricted geometry that are impossible with the existing art.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims, including any amendments made during the pendency of this application and all equivalents of those claims as issued.

The invention claimed is:

1. A machining apparatus comprising:
   a base section;
   a turret extending from the base section and driven to rotate about a central vertical turret axis;
   a plurality of cutting tools affixed to the turret proximate the circumference of the turret and extending below the turret, wherein rotation of the turret about the central turret axis causes the cutting tools to translate along an arcuate path, and wherein each of the cutting tools is configured to be driven along plural translational axes relative to the turret;
   at least one table positioned below the turret for holding a respective workpiece in a fixed position in relation to the at least one table such that the at least one table moves independently of the cutting tools; and
   a programmable controller configured to cause the turret to rotate about the central turret axis while a cutting edge of one of the cutting tools is in operative engagement with the workpiece that is held by the at least one table in order to cause the cutting edge to translate along the arcuate path to cut the workpiece that is held by the at least one table while the one cutting tool is not rotated with a continuous milling-type rotation and while the workpiece that is held by the at least one table is not rotated with a continuous lathing-type rotation; and
   wherein the turret and the at least one table move relative to one another in a three-dimensional workspace for profiling the workpiece into a predetermined shape.

2. A machining apparatus as in claim 1, wherein the turret provides the driving motion for driving each of the cutting tools along the plural translational axes of the turret.

3. A machining apparatus as in claim 2, wherein the plural translational axes include a linear axis.

4. A machining apparatus as in claim 1, wherein the turret provides a positioning motion for each of the cutting tools.

5. A machining apparatus as in claim 1, wherein the at least one table is movable along a plurality of axes.

6. A machining apparatus as in claim 1, wherein the cutting tools are asymmetrical.

7. A machining apparatus as in claim 1, wherein the machining apparatus is capable of providing movements of the one cutting tool and the at least one table so as to provide a three-dimensional cutting tool path through the workpiece.

8. A machining apparatus as in claim 1, further comprising a support mechanism extending from the base section, on which support mechanism the turret is supported, and which support mechanism is configured for controlling the rotation of the turret.

9. A machining apparatus as in claim 1, wherein the programmable controller is configured to cause the machining apparatus to apply the one cutting tool to the workpiece with at least 20,000 pounds per square inch of areal contact between the one tool and the workpiece.

10. A machining apparatus 1, wherein the programmable controller is configured to cause the machining apparatus to apply the one cutting tool to the workpiece with at least 50,000 pounds per square inch of areal contact between the one tool and the workpiece.

11. A machining apparatus 1, wherein the programmable controller is configured to cause the machining apparatus to apply the one cutting tool to the workpiece with at least 60,000 pounds per square inch of areal contact between the one tool and the workpiece.

12. A machining apparatus 1, wherein the programmable controller is configured to cause the machining apparatus to apply the one cutting tool to the workpiece with at least 80,000 pounds per square inch of areal contact between the one tool and the workpiece.

13. A machining apparatus 1, wherein the programmable controller is configured to cause the machining apparatus to apply the one cutting tool to the workpiece with at least 150,000 pounds per square inch of areal contact between the one tool and the workpiece.

* * * * *